(12) United States Patent
Frederick

(10) Patent No.: US 9,677,750 B2
(45) Date of Patent: Jun. 13, 2017

(54) ELECTRICAL LAMP FOR HOLDING AND DISPLAYING A COLLECTOR'S ROUND OR OVAL ITEM

(71) Applicant: Larson Frederick, Raleigh, NC (US)

(72) Inventor: Larson Frederick, Raleigh, NC (US)

( * ) Notice: Subject to any disclaimer, the term of this patent is extended or adjusted under 35 U.S.C. 154(b) by 70 days.

(21) Appl. No.: 14/819,440

(22) Filed: Aug. 6, 2015

(65) Prior Publication Data

US 2015/0338085 A1   Nov. 26, 2015

Related U.S. Application Data

(60) Provisional application No. 62/036,383, filed on Aug. 12, 2014.

(51) Int. Cl.
| | |
|---|---|
| *F21V 23/00* | (2015.01) |
| *F21V 23/06* | (2006.01) |
| *F21V 1/00* | (2006.01) |
| *F21S 6/00* | (2006.01) |
| *A47G 33/00* | (2006.01) |
| *G09B 27/08* | (2006.01) |

(52) U.S. Cl.
CPC ............... *F21V 23/06* (2013.01); *F21S 6/002* (2013.01); *F21V 1/00* (2013.01); *A47G 33/004* (2013.01); *G09B 27/08* (2013.01)

(58) Field of Classification Search
CPC ............ F21V 23/06; F21V 1/00; F21S 6/002
See application file for complete search history.

(56) References Cited

U.S. PATENT DOCUMENTS

| | | | | | |
|---|---|---|---|---|---|
| 2,125,358 | A | * | 8/1938 | Renholdt | ................ F21S 6/002 |
| | | | | | 362/134 |
| 2,200,821 | A | * | 5/1940 | Colberg | ................ G09B 27/08 |
| | | | | | 362/809 |

\* cited by examiner

*Primary Examiner* — Thomas M Sember

(57) ABSTRACT

Disclosed is an electrical lamp for holding and displaying a collector's round (or oval) item. The lamp comprises a base assembly comprising a base and a bottom plate secured to a top surface of the base, a top assembly comprising a top plate, a lamp assembly comprising an electrical light bulb connected to the top plate, and a lamp shade encircling the light bulb, and a connecting means for connecting the top and base assemblies such that, the top and bottom plates are vertically aligned. The round item is adapted to be snugly and removably received between the top and bottom plates.

19 Claims, 11 Drawing Sheets

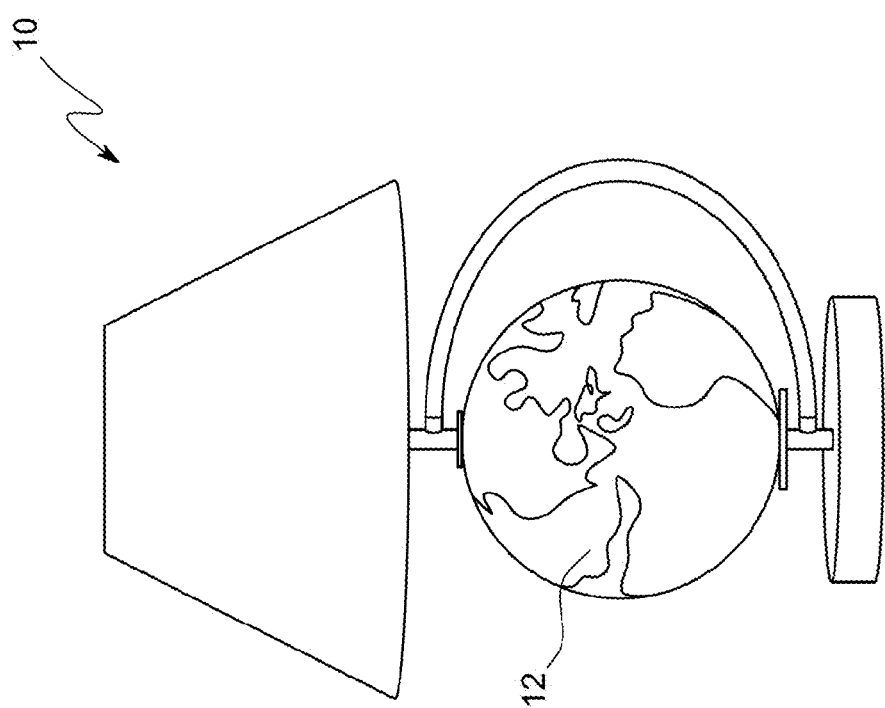

ELECTRICAL LAMP FOR HOLDING AND DISPLAYING A COLLECTOR'S ROUND OR OVAL ITEM

PRIORITY CLAIM

This application claims the benefit of the provisional patent application Ser. No. 62/036,383 filed Aug. 12, 2014, the contents of which are incorporated herein by this reference.

BACKGROUND

Field of the Invention

The present invention relates to electrical sports lamps and more particularly, an electrical lamp capable of removably holding and displaying a real sports ball.

Sports play an important role in many people's lives. Whether it is soccer, football or basketball, sport enthusiasts can never have enough sports novelties. Traditional sports novelties come in a variety of forms such displays, mugs, pens, banners, pictures, jewelry, decorations and much more. The most common form of displays for sports items are individual stands or cases that keep sports items contained and out of reach. One of the most treasured items of sports, whether it be professional or little league, is a sports ball itself.

Traditional sports lamps known in the art comprise artificial sports balls or novelties that are incorporated into a lamp stand. Though traditional sports lamps provide a more accessible display of sports novelties, they are not designed to display real sports balls.

Therefore, in the light of what is discussed, there is a need in the art for an electrical lamp that holds and displays a real sports ball as it is.

SUMMARY

The present invention comprises an electrical lamp for removably holding and displaying a round or oval collector's item, which comprises a collector's sports ball. Notably, the sports ball is not altered in any way in order to be inserted into the lamp.

The lamp comprises a base assembly comprising a circular base about which the lamp is placed on a tabletop, or the like, and a circular bottom plate disposed above the top surface of the base. A bottom pipe tee connects the base and the bottom plate. The lamp further comprises a top assembly comprising a top pipe tee and a circular top plate threadably coupled to the bottom extremity of the top tee. A light bulb is coupled to the top extremity of the top tee wherein, the light bulb is encircled by a lamp shade. A rigid C-shaped pipe connects the top and base assemblies such that, the top and bottom plates face one another. A sports ball snugly received between the top and bottom plates.

Other objects and advantages of the embodiments herein will become readily apparent from the following detailed description taken in conjunction with the accompanying drawings.

BRIEF DESCRIPTION OF THE DRAWINGS

FIG. 3, according to another embodiment of the present invention, is the illustration of the lamp holding a spherical item representative of a spatial body.

FIGURES—REFERENCE NUMERALS

10—Electrical Lamp
12—Round (or Oval) Collector's Item
14—Base Assembly
16—Top Assembly
18—Base
20—Bottom Pipe Tee
22—Bottom Plate Assembly
23—Top Surface of the Base
24—Sidewall
26—Extrusion
28—Top Extremity of the Bottom Tee
30—Bottom Extremity of the Bottom Tee
32—Side Extremity of the Bottom Tee
34—Bottom Plate
36—Compression Spring
38—Male Threaded Member
40—Top Plate Assembly
42—Top Pipe Tee
44—Top Plate
46—Top Extremity of the Top Tee 48—Bottom Extremity of the Top Tee
50—Side Extremity of the Top Tee
52—C-shaped Pipe
54—V-shaped Pipe
56—Gooseneck Tubing Pipe
58—Short Pipe
60—Light Bulb

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 2:
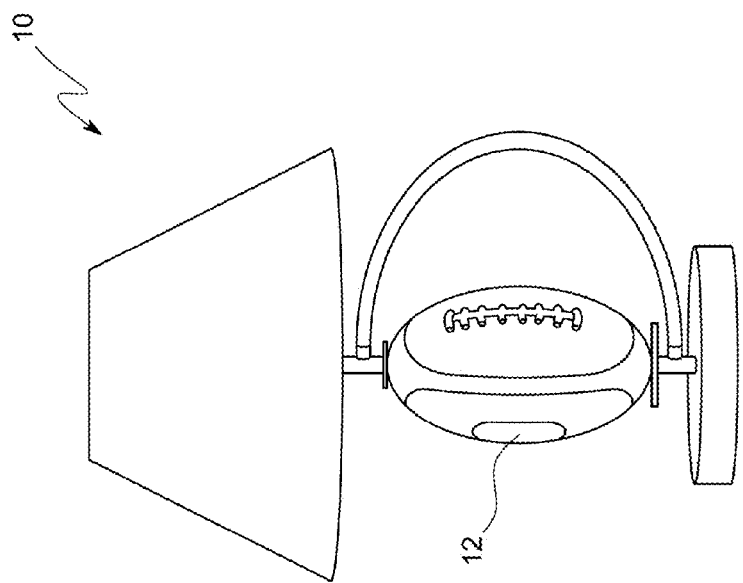
FIGS. 1 and 2, according to an embodiment of the present invention, are illustrations of an electrical lamp holding different collector's sports balls.
Figure 1:
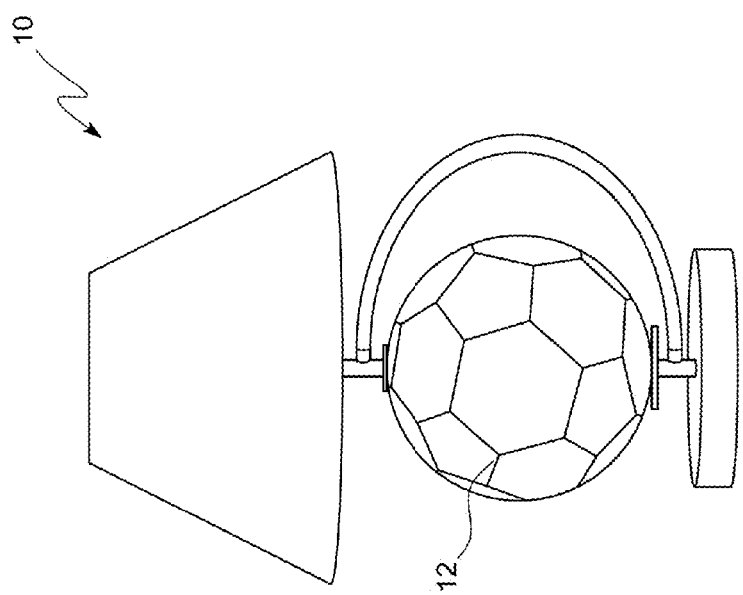
Figure 4:
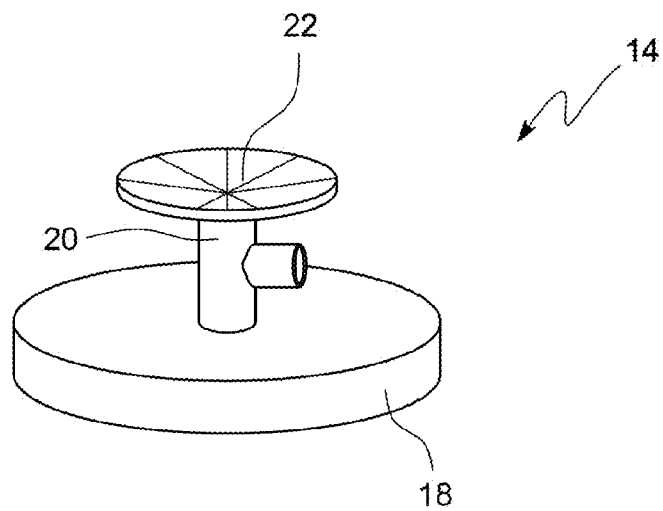
FIG. 4, according to an embodiment of the present invention, is an illustration of a perspective view of the base assembly.
Figure 5:
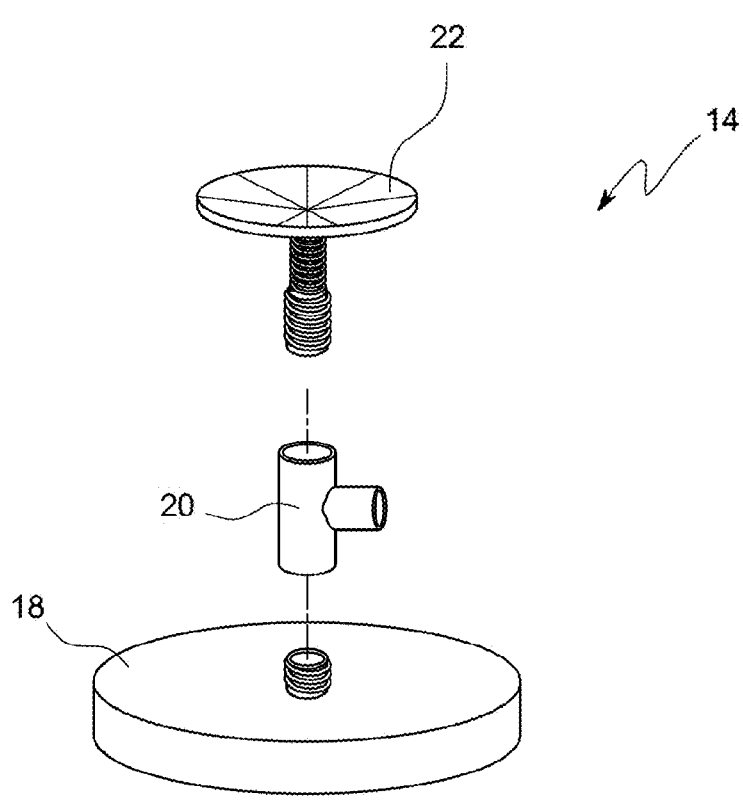
FIG. 5, according to an embodiment of the present invention, is an illustration of an exploded perspective view of the base assembly.
Figure 6:
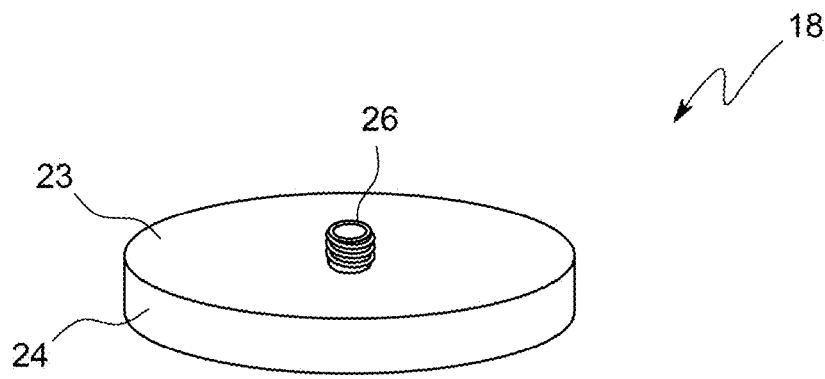
FIG. 6, according to an embodiment of the present invention, is an illustration of a perspective view of the base.
Figure 7:
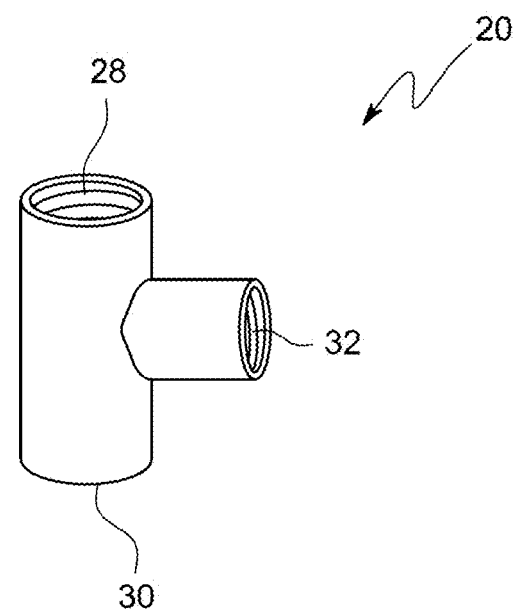
FIG. 7, according to an embodiment of the present invention, is an illustration of a perspective view of the bottom tee.

Referring to FIGS. 1 through 3, the present invention comprises an electrical lamp 10 for removably holding and displaying a round (or oval) collector's item 12, which comprises a collector's sports ball. The collector's sports ball may comprise one of a football, American football, rugby football, basket ball, volley ball, water polo ball, Canadian football, and an Australian Rules football. Alternatively, as can be appreciated from FIG. 3, the round (or oval) item 12 may comprise a spherical object representative of a spatial body such as, a globe.

Figure 9:
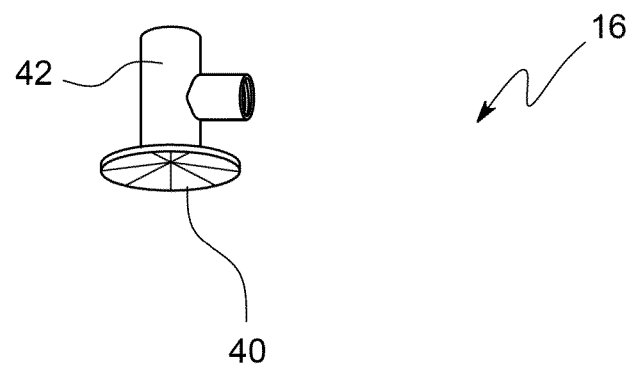
FIG. 9, according to an embodiment of the present invention, is an illustration of a perspective view of the top assembly.
Figure 10:
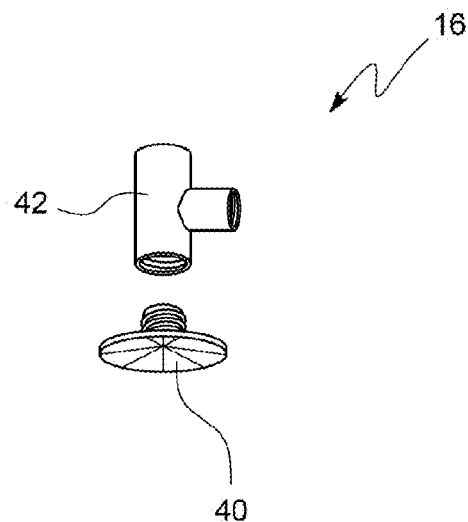
FIG. 10, according to an embodiment of the present invention, is an illustration of an exploded perspective view of the top assembly.
Figures 11, 12:
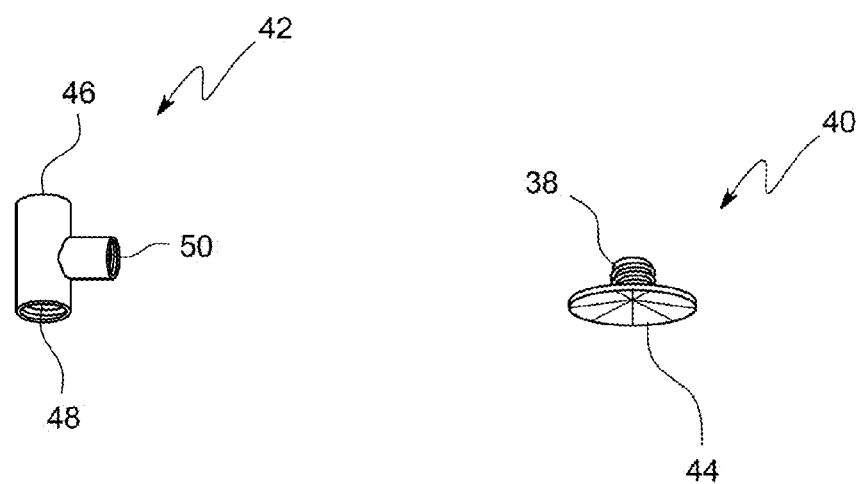
FIG. 11, according to an embodiment of the present invention, is an illustration of a perspective view of the top tee.
FIG. 12, according to an embodiment of the present invention, is an illustration of a perspective view of the top plate assembly.
Figure 13:
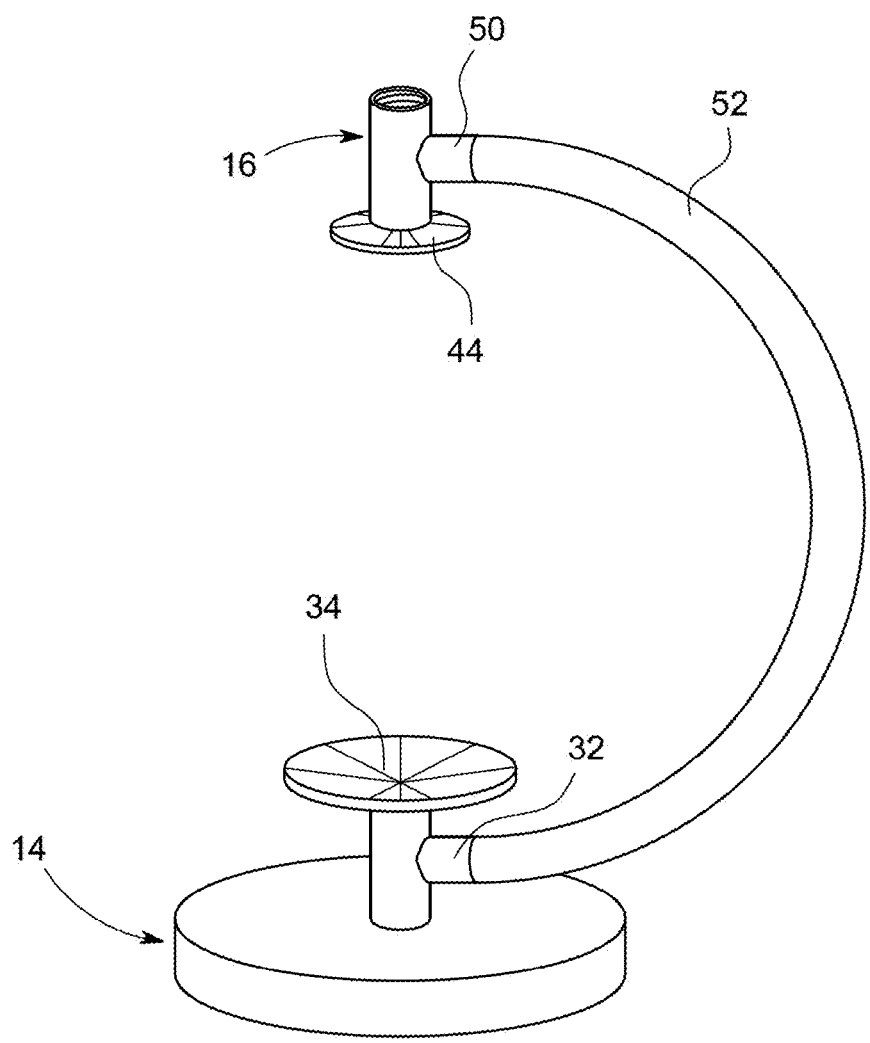
FIG. 13, according to an embodiment of the present invention, is an illustration of the top and base assemblies connected by a C-shaped pipe.
Figure 14:
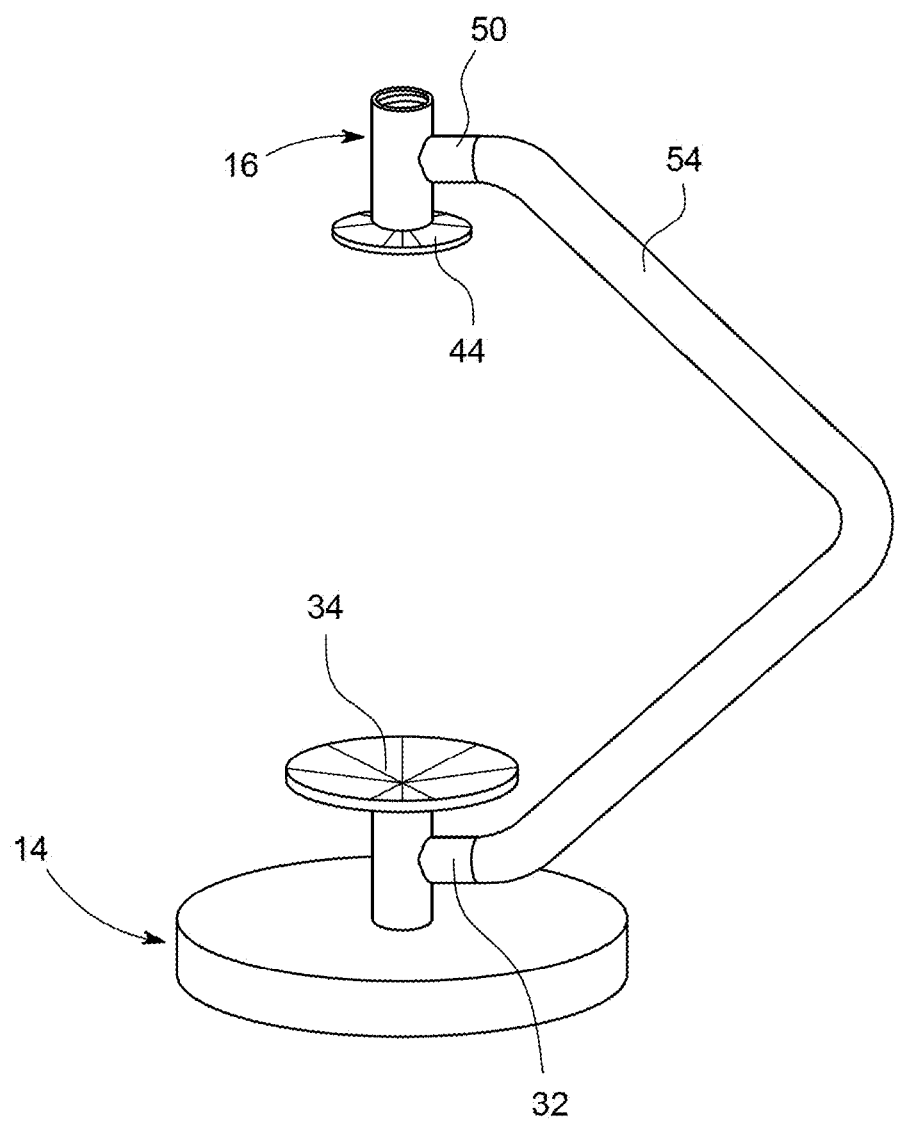
FIG. 14, according to an alternate embodiment of the present invention, is an illustration of the top and base assemblies connected by a V-shaped pipe.
Figure 15:
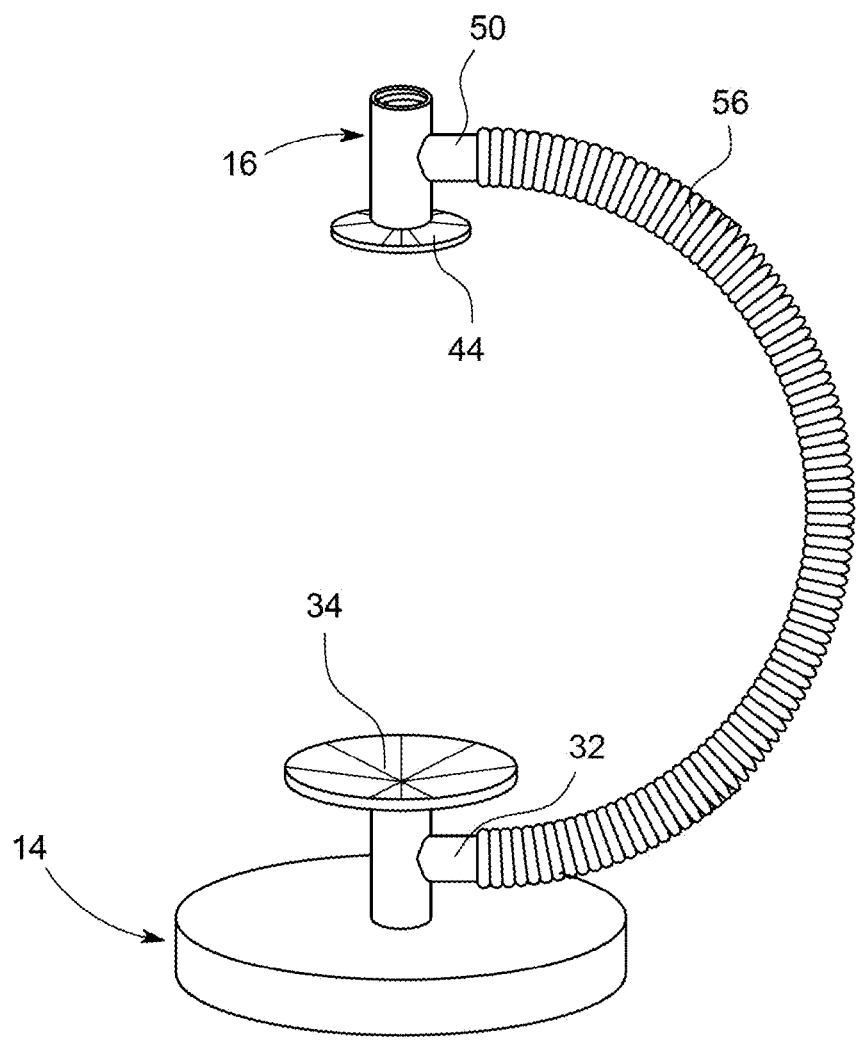
FIG. 15, according to an alternate embodiment of the present invention, is an illustration of the top and base assemblies connected by a flexible gooseneck tubing pipe.
Figure 16:
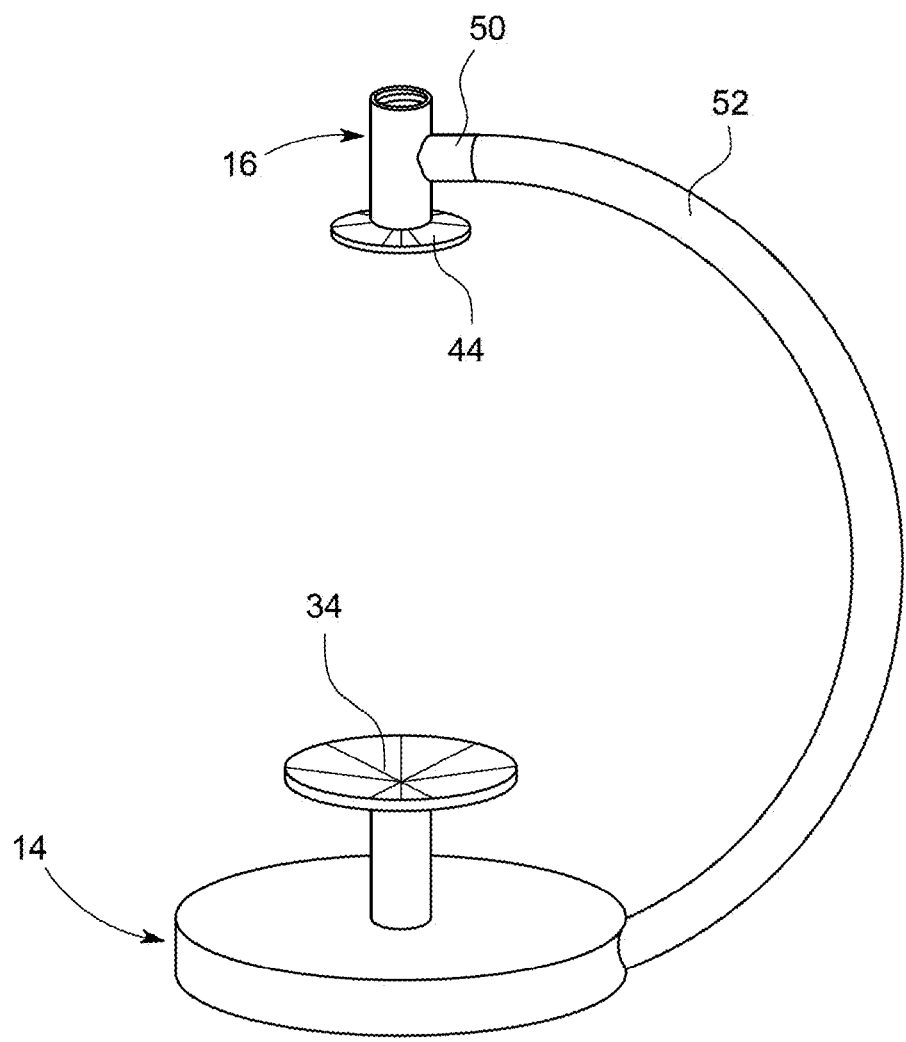
FIG. 16, according to an alternate embodiment of the present invention, is an illustration of the top and base assemblies connected by a C-shaped pipe.

Referring FIGS. 4 through 7, the lamp 10 comprises base assembly 14, top assembly 16 (FIG. 9) and a lamp assembly. The base assembly 14 in turn comprises a base 18, a bottom pipe tee 20, and a bottom plate assembly 22. The base 18, about which the lamp 10 is placed on a tabletop or on a ground or floor, comprises opposingly-disposed planar top 23 and bottom surfaces and a sidewall 24 extending between the top 23 and bottom surfaces. Although, the base 18 is preferably of a circular shape, it can be of any other conventional or non-conventional shape, such as, for example, rectangular, oval, etc., as long as the utility thereof is not compromised. A vertical threaded extrusion 26 extends centrally and upwardly from the top surface 23 of the base 18. The bottom tee 20, on the basis of the positional orientation thereof, comprises top and bottom extremities 28 and 30 and a side extremity 32, wherein, an extremity is basically a female threaded outlet. The bottom tee 20 is adapted to be coupled to the base 18 as the bottom extremity 30 is threadably coupled to the extrusion 26. Notably, the base 18 is a hollow cylindrical member for reasons that will become apparent from the following body of text.

Figure 8:
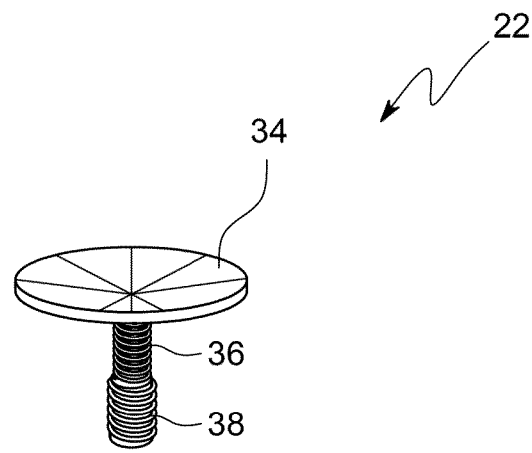
FIG. 8, according to an embodiment of the present invention, is an illustration of a perspective view of the bottom plate assembly.

Referring to FIG. 8, the bottom plate assembly 22 comprises a circular bottom plate 34, the top surface of which being gradually downwardly depressed from the circumference to the centre. The bottom plate assembly 22 further comprises a compression spring 36 axially extending from an extremity of a male threaded member 38. The free end of the spring 36 is centrally attached to the bottom surface of the bottom plate 34. The bottom plate assembly 22 is coupled to the bottom tee 20 as the threaded member 38 is threadably coupled into the top extremity 28 of the bottom tee 20 whereby, by virtue of the compression spring 36, the bottom plate 34 is compressed downwards upon the placement of appropriate weight thereon.

Referring to FIGS. 9 through 12, the top assembly 16 comprises a circular top plate assembly 40 and a top pipe tee 42. The top tee 42, on the basis of the positional orientation thereof, comprises top and bottom extremities 46 and 48 and a side extremity 50, wherein, an extremity basically comprises a female threaded outlet. The top plate assembly 40 comprises a circular top plate 44, the bottom surface of which being gradually upwardly depressed from the circumference to the centre. The top plate assembly 40 further comprises a male threaded member 38 that is centrally and axially attached to the top surface of the top plate 44. The top plate assembly 40 is coupled to the top tee 42 as the threaded member 38 is threadably coupled into the bottom extremity 48 of the top tee 42. Notably, the top plate 44 is smaller than the bottom plate.

Referring to FIGS. 13 through 16, the lamp 10 further comprises a connecting means for connecting the base and top assemblies 14 and 16. More particularly, the connecting means, as can be appreciated from FIG. 13, comprises a rigid C-shaped pipe 52 that extends between side extremities 32 and 50 of the top and bottom tees 20 and 42. In one embodiment, as can be appreciated from FIG. 14, the connecting means may comprise a rigid, side-tilted substantially V-shaped pipe 54. In another embodiment, the connecting means comprises flexible gooseneck tubing pipe 56. The top and base assemblies 14 and 16 are connected by the connecting means such that, the top and bottom tees 20 and plates 20 & 42 and 34 & 44 are vertically aligned. As can be appreciated from FIG. 16, in one embodiment, the connecting means extends between the base 18 and the top assembly 16. In this embodiment, a short pipe 58 is employed in lieu of the bottom tee 20.

Figure 17:
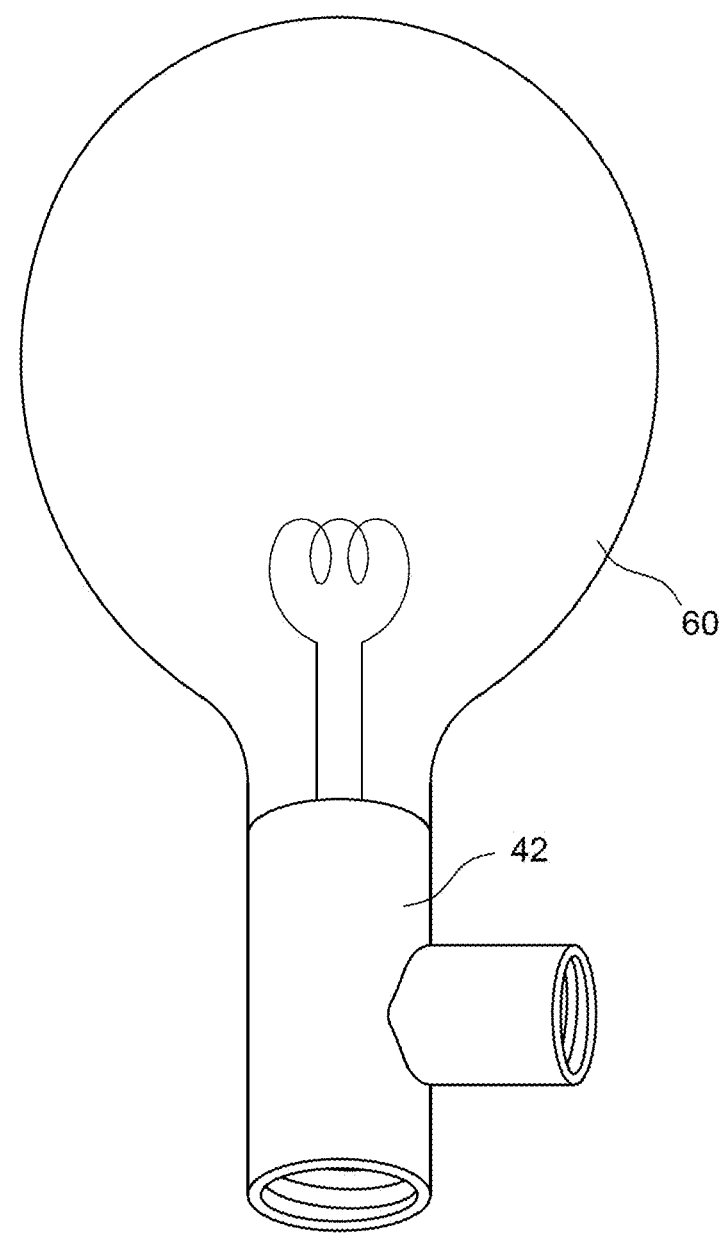
FIG. 17, according to an embodiment of the present invention, is an illustration of the light bulb coupled to the top tee.

Referring to FIGS. 1 and 2, and 17, the lamp assembly comprises a light bulb 60 coupled to the top extremity of the top tee 42 and a lamp shade (not shown) preferably secured to the top tee 42 such that, the lamp shade encircles and encloses (at least partially) the light bulb 60. The light bulb 60 is any traditional table lamp light bulb. Electrical circuitry is disposed within the base 18, as the base 18, as mentioned earlier, is hollow. The light bulb 60 is disposed in operative communication with the electrical circuitry as enabled by an electrical cable connecting both. More particularly, the electrical cable proceeds from within the base 18, extends through the extrusion 26, bottom tee 20, connecting means through the side extremity 32 of the bottom tee 20, and finally through the top tee 42 through the side extremity 50 thereof before being connected to the light bulb 60. A plug (not shown), which is disposed in operative communication with the electrical circuitry, extends through circular wall of the base 18 for insertion into an appropriate electrical socket in order to power the light bulb 60. Alternatively, the light bulb 60 may be powered by a battery.

Further, a power switch is disposed preferably on the base 18 for selectively turning the light bulb 60 on or off. The switch may be a button, a plurality of buttons, a knob, or the like. The switch may be located anywhere on the base 18 so as to be readily accessible. In one embodiment (not shown), the power switch is replaced with a touch-sensitive button wherein, the components required for the touch-sensitive button are disposed within the base 18.

Referring to FIGS. 1 and 2, in order to assemble the round item 12 to the lamp 10, by pressing the bottom plate 44 slightly downwards, the round item 12 is simply introduced between the top and bottom plates 34 and 44. Thereafter, the bottom plate 44 is released so as to ensure a snug fit between the round item 12 between the top and bottom plates 34 and 44. In order to remove the round item 12, the round item 12 simply needs to be pressed downwards and subsequently pushed sideways so as to freely release round item 12 from the lamp 10.

In one embodiment (not shown), the bottom plate is disposed in operative communication with a motor disposed within the base, which is powered by the same electrical power source that powers the lamp. The top plate extends from a bearing so as to render the top plate freely rotatable. As the round item is snugly disposed between the top and bottom plates, the rotation of the bottom plate causes the round item and the top plate to rotate. Notably, pressure of the spring-loaded bottom plate against the round item causes the round item to be in place during the rotation thereof. In one embodiment, instead of just one motor, each of the top and bottom plates is disposed in operative communication with a motor. In one embodiment, additional controls, in form of switches, knobs, or the like, are incorporated on the base so as to control aspects of the spinning feature such as, the speed, direction, etc.

In one embodiment (not shown), the outer surface of the round item is attached with a pair of opposingly-disposed magnetic discs by means of suction, adhesion, or the like. Each magnetic disc is of a concave shape such that, the inner contour of the magnetic disc matches the outer contour of the round item. Further, in this embodiment, each of the top and bottom plates and is attached or overlaid with a magnetic plate. In this embodiment, the compression spring is done away with and the distance between the top and bottom plates is increased whereby, in order to incorporate the round item into lamp, the round item simply needs to be held between the top and bottom plates such that, the magnetic discs face the magnetic plates. The polarity of the magnetic discs is opposite to that of the magnetic plates whereby, as the round item is held between the top and bottom plates, as a result of the repulsion between the magnetic plates and discs, the round item is suspended in air between the top and bottom plates. In one embodiment, each of the top and bottom plates is disposed in operative communication with a motor, which is powered by the same electrical power source as the lamp. The rotation of the top and bottom plates induces the same rotary motion in the magnetic discs causing the round item to rotate. In one embodiment, additional controls, in form of switches, knobs, or the like, are incorporated on the base so as to control aspects of the spinning feature such as, the speed, direction, etc.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the invention has been explained in relation to its various embodiment, it is to be understood that many other possible modifications and variations can be made without departing from the spirit and scope of the invention.

Although the embodiments herein are described with various specific embodiments, it will be obvious for a person skilled in the art to practice the invention with modifications. However, all such modifications are deemed to be within the scope of the claims.

What is claimed is:

1. An electrical lamp for holding and displaying a collector's round (or oval) item, the lamp comprising:
   a base assembly;
   the base assembly comprising
   a base and
   a bottom plate;
   the bottom plate being secured to a top surface of the base;
   a top assembly;
   the top assembly comprising a top plate;
   a lamp assembly;
   the lamp assembly comprising a light source;
   the light source being connected to the top plate;
   the light source being a light bulb;
   a connecting member;
   the connecting member connecting the top and base assemblies such that the top and bottom plates are vertically aligned;
   the connecting member being a tube;
   the round item being adapted to be removably received between the top and bottom plates;
   an electrical circuitry;
   the electrical circuitry being disposed within the base;
   the base assembly comprising a bottom tee;
   the top assembly comprising a top tee;
   an electrical cable; and
   the electrical cable proceeding from within the base, sequentially extending through the bottom tee, the tube and the top tee, and being connected to the light bulb.

2. The lamp of claim 1 wherein the top and bottom tees are vertically aligned to each other, each tee comprising a pair of oppositely-disposed top and bottom extremities and a side extremity wherein, the top extremity of the bottom tee faces the bottom extremity of the top tee as the top and bottom tees are vertically aligned, the bottom plate threadably coupled to the top extremity of the bottom tee while the top plate is threadably coupled to the bottom extremity of the top tee, the bottom extremity of the bottom tee threadably coupled to the top surface of the base, the top extremity of the top tee coupled to the light bulb.

3. The lamp of claim 2 wherein, the connecting member extends between the side extremity of the top tee and the side extremity of the bottom tee.

4. The lamp of claim 2 wherein, the tube extends between the base and the side extremity of the top tee.

5. The lamp of claim 1 wherein, the tube comprises a substantially C-shaped pipe.

6. The lamp of claim 1 wherein, the tube comprises a flexible metal tubing pipe.

7. The lamp of claim 1 wherein, the round item comprises a ball.

8. The lamp of claim 7 wherein, the ball comprises one of a football, American football, rugby football, basket ball, volley ball, water polo ball, Canadian football, and Australian rules football.

9. The lamp of claim 1 wherein, the round item comprises a spherical object representative of a spatial body.

10. The lamp of claim 1 wherein, a bottom surface of the bottom plate is centrally attached with a compression spring such that, the spring is perpendicular to the bottom plate, the spring axially extends from a longitudinal extremity of an externally threaded member, which is adapted to be threadably coupled to a top extremity of the bottom tee so as to secure the bottom plate to the bottom tee, the bottom plate being spring loaded as a result of being coupled to the spring.

11. The lamp of claim 1 further comprising:
the electrical circuitry being in operative communication with the light bulb; and
a plug disposed in operative communication with the electrical circuitry, the plug for insertion into a power outlet, the plug extending through the base.

12. The lamp of claim 1 wherein, the base is of a circular shape.

13. The lamp of claim 1 wherein, the light bulb being an electrical light bulb.

14. The lamp of claim 1 wherein, the lamp assembly further comprises a lamp shade that encircles around the light bulb.

15. The lamp of claim 1 wherein, each of the top and bottom plates is circular.

16. The lamp of claim 15 wherein, the bottom plate is larger than the top plate.

17. The lamp of claim 1 wherein, each of the top and bottom plates is adapted to be rotatable so as to impart the rotary to the round item upon being disposed between the top and bottom plates.

18. The lamp of claim 17 wherein, the rotation of the top and bottom plates is caused by one or more motors.

19. The lamp of claim 1 further comprising:
a pair of concave magnetic discs attached over a surface of the round item such that, the magnetic discs are opposingly disposed, a contour of an inner surface of each magnetic disc matches with an outer contour of the round item so as to achieve a close fit between the magnetic discs and the round item;
a pair of magnetic plates overlaid on the top and bottom plates, the pair of magnetic plates being opposite to that of the magnetic discs; and
wherein, placing the round item between the top and bottom plates such that the magnetic discs face the magnetic plates causes the round item to suspend in air between the top and bottom plates and wherein, each of the top and bottom plates is disposed in operative communication with a motor causing the top and bottom plates to rotate wherein, as the round item is suspended between the top and bottom plates and as the top and bottom plates are rotated, the rotary motion of the top and bottom plates is imparted to the round item.

* * * * *